United States Patent
Rofougaran

(10) Patent No.: US 8,041,386 B2
(45) Date of Patent: Oct. 18, 2011

(54) CONFIGURABLE MULTIPLE MODE RFIC

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/029,363

(22) Filed: Feb. 17, 2011

(65) Prior Publication Data

US 2011/0143686 A1 Jun. 16, 2011

Related U.S. Application Data

(63) Continuation of application No. 11/729,390, filed on Mar. 28, 2007, now Pat. No. 7,894,851, which is a continuation-in-part of application No. 11/641,999, filed on Dec. 19, 2006.

(51) Int. Cl.
 *H04M 1/00* (2006.01)
(52) U.S. Cl. .............. 455/552.1; 455/553.1; 455/102; 455/103; 455/108; 455/127.1; 455/127.4; 455/205; 455/208
(58) Field of Classification Search .............. 455/552.1, 455/553.1, 102, 103, 108, 112, 118, 127.1–127.4, 455/227, 228, 232.1, 205, 208, 216
See application file for complete search history.

(56) References Cited

U.S. PATENT DOCUMENTS

| | | | | |
|---|---|---|---|---|
| 6,970,681 | B2 * | 11/2005 | Darabi et al. | 455/73 |
| 7,336,934 | B2 * | 2/2008 | Ikedo et al. | 455/108 |
| 7,647,026 | B2 * | 1/2010 | Darabi | 455/67.13 |
| 7,653,359 | B2 * | 1/2010 | Darabi | 455/76 |
| 2005/0169416 | A1 * | 8/2005 | Liu | 375/362 |

* cited by examiner

*Primary Examiner* — Tuan A Tran
(74) *Attorney, Agent, or Firm* — Garlick Harrison & Markison; Bruce E. Garlick

(57) ABSTRACT

An integrated circuit (IC) includes a baseband processing module and a radio frequency (RF) section. The baseband processing module is coupled to convert outbound data or an outbound voice signal into at least one of amplitude modulation information, phase modulation information, and frequency modulation information. The RF section includes an oscillation module, a frequency divider, and power amplifier modules. The oscillation module produces an RF oscillation that it modulates based on the phase or frequency modulation information to produce a modulated RF signal. The frequency divider divides the frequency of the modulated RF signal to produce a frequency divided modulated RF signal. The first power amplifier module amplifies the modulated RF signal in accordance with the amplitude modulation information or a constant to produce a first frequency band outbound RF data or voice signal. The second power amplifier amplifies the frequency divided modulated RF data signal in accordance with the amplitude modulation information or a constant to produce a second frequency band outbound RF data or voice signal.

6 Claims, 9 Drawing Sheets

CONFIGURABLE MULTIPLE MODE RFIC

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to U.S. Utility patent application Ser. No. 11/729,390, entitled "Configurable Multiple Mode RFIC," filed Mar. 28, 2007, scheduled to be issued as U.S. Pat. No. 7,894,851 on Feb. 22, 2011, which is a continuation-in-part patent application of co-pending patent application U.S. Utility patent application Ser. No. 11/641,999, entitled "Voice/Data/RF Integrated Circuit," filed Dec. 19, 2006, the contents of which are hereby incorporated herein by reference in their entirety and made part of the present U.S. Utility Patent Application for all purposes.

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As the desire for wireless communication devices to support multiple standards continues, recent trends include the desire to integrate more functions on to a single chip. However, such desires have gone unrealized when it comes to implementing baseband and RF on the same chip for multiple wireless communication standards.

Therefore, a need exists for an integrated circuit (IC) that implements baseband and RF of multiple wireless communication standards on the same IC die.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
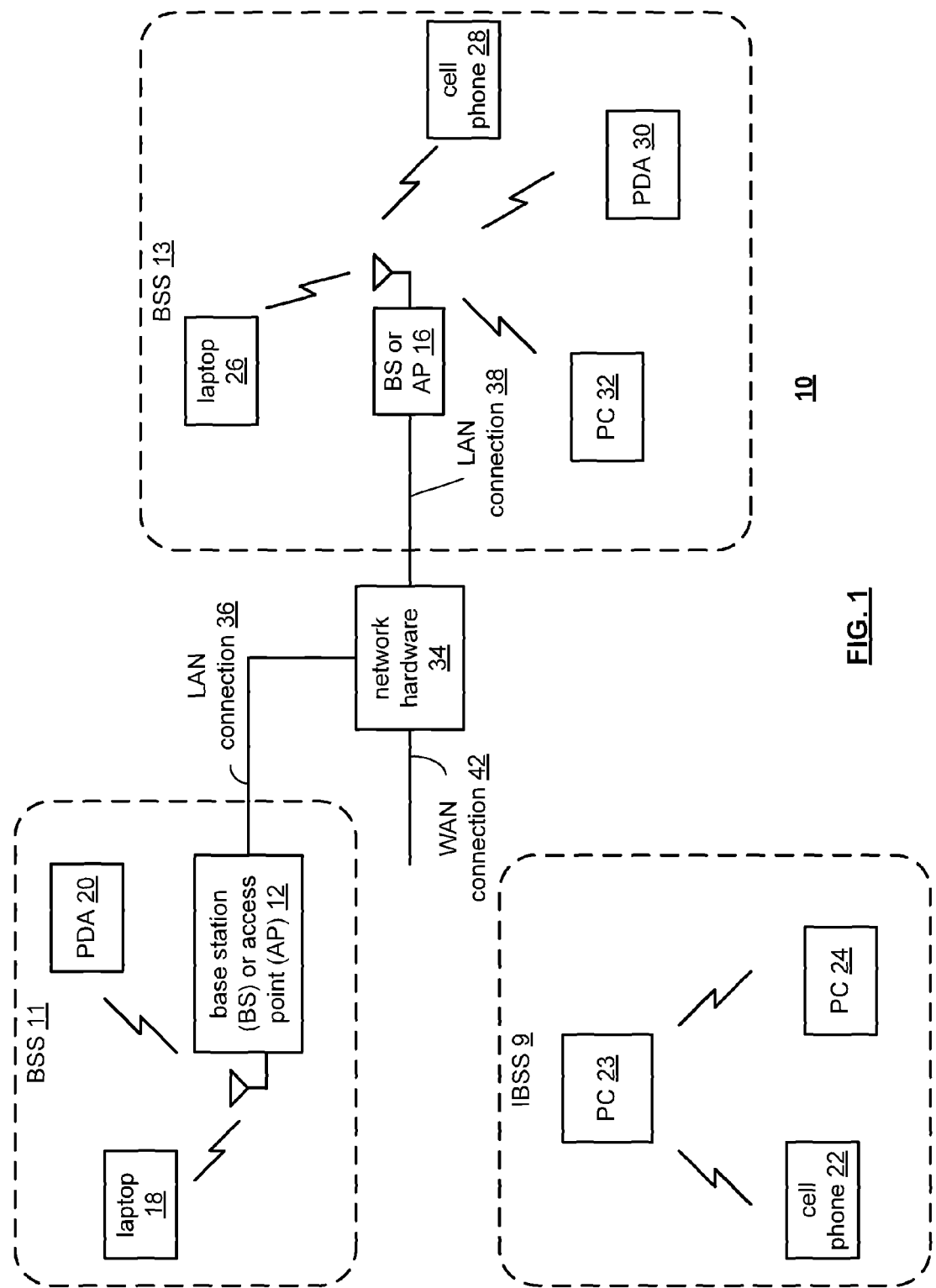
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-9.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
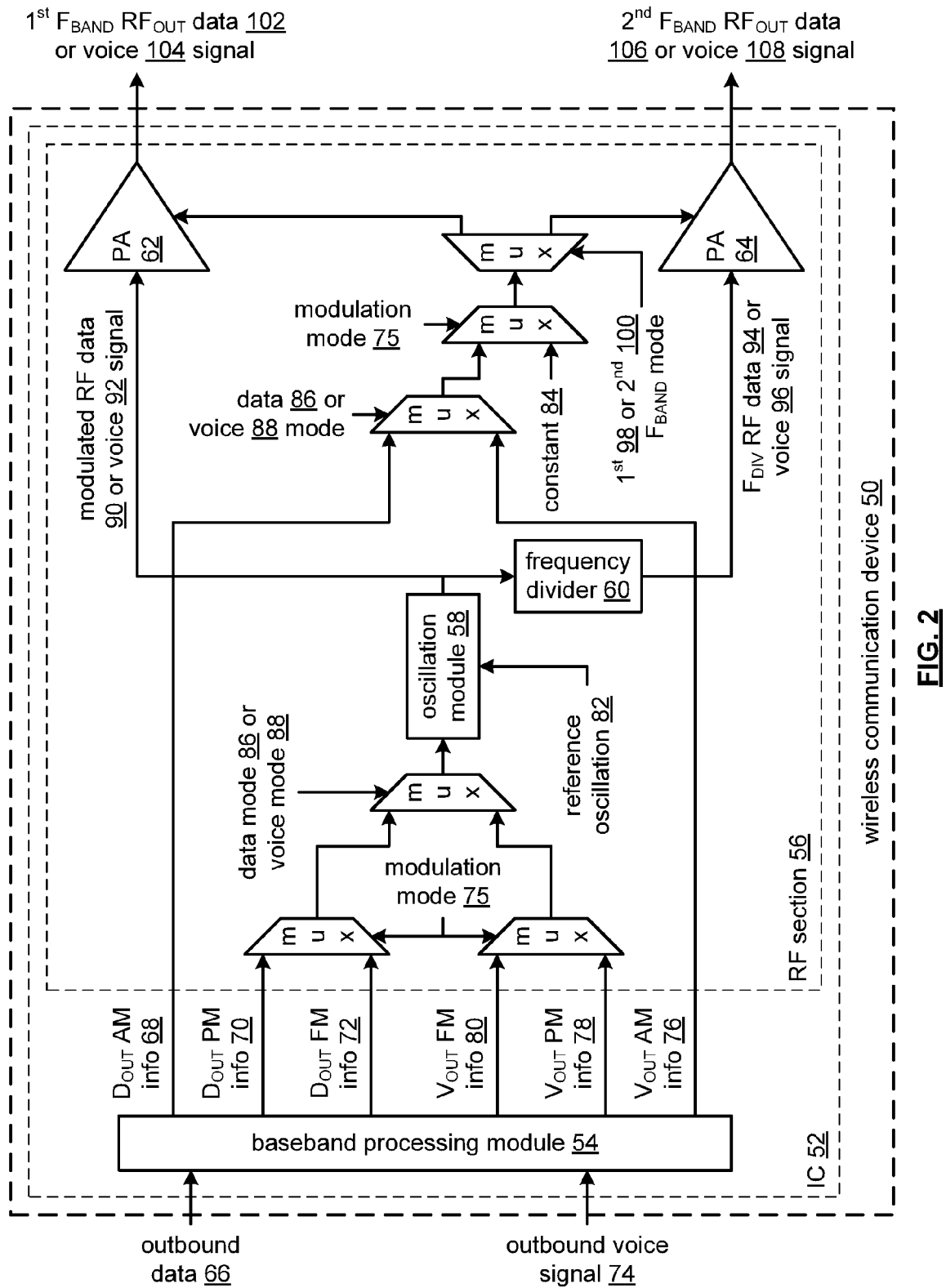
FIG. 2 is a schematic block diagram of an embodiment of a wireless communication device in accordance with the present invention.

FIG. 2 is a schematic block diagram of an embodiment of a wireless communication device 50 that may be one of the communication devices 18-32 of FIG. 1 or another type of communication device. In this embodiment, the wireless communication device 50 includes an integrated circuit 52 that is coupled to convert outbound data 66 and/or an outbound voice signal 74 into a first frequency band outbound RF data signal 102, a first frequency band outbound RF voice signal 104, a second frequency band outbound RF data signal 106, and/or a second frequency band outbound RF voice signal 108. The IC 52 includes a baseband processing module 54 and a radio frequency (RF) section 56, which includes an oscillation module 58, a frequency divider 60, a first power amplifier module 62, and a second power amplifier module 64.

The baseband processing module 54 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-9.

In a data mode, the baseband processing module 54 converts outbound data 66 (e.g., (e.g., data, a text file, an audio file, a video file, an image file, and/or a combination thereof)

into outbound data amplitude modulation information 68, outbound data phase modulation information 70, and/or outbound data frequency modulation information 72 in accordance with a wireless communication protocol (e.g., IEEE 802.11a, b, g, n, etc., Bluetooth, ZigBee, EDGE, GPRS, HSDPA, HSUPA, etc.). For example, when the baseband processing module 54 is configured in accordance with the GPRS protocol, it converts the outbound data 66 into a GMSK (Gaussian Minimum Shift Keying) symbol stream, where GMSK is a type of frequency shift keying (FSK). Thus, for this example, the baseband processing module 54 is converting the outbound data 66 into the outbound data frequency modulation information 72 (e.g., GMSK symbol stream).

In another example, if the baseband processing module 54 is configured in accordance with an EDGE protocol, then it converts the outbound data 66 into an 8-PSK (8-Phase Shift Keying) symbol stream. Thus, for this example, the baseband processing module 54 I converting the outbound data 66 into the outbound data amplitude modulation information 68 and the outbound data phase modulation information 70.

In another example, w the baseband processing module 54 is configured in accordance with an HSDPA protocol, then it converts the outbound data 66 into an adaptive modulation and coding (AMC) symbol stream. During initial setup and/or average radio conditions, the AMC utilizes a QPSK (quadrature phase shift keying) scheme. As such, the baseband processing module 54 is converting the outbound data 66 into a QPSK symbol stream, which includes the outbound data phase modulation information 70. If the radio conditions are good, then the baseband processing module 54 may use a 16 QAM (quadrature amplitude modulation) scheme. In this instance, the baseband processing module 54 converts the outbound data 66 into a 16 QAM symbol stream, which includes the outbound data amplitude modulation information 68 and the outbound data phase modulation information 70.

In a voice mode, the baseband processing module 54 converts the outbound voice signal 74 into outbound voice amplitude modulation information 76, outbound voice phase modulation information 78, and/or outbound voice frequency modulation information 80 in accordance with a wireless communication protocol (e.g., IEEE 802.11 a, b, g, n, etc., Bluetooth, ZigBee, GSM, CDMA, WCDMA, etc.). For example, when the baseband processing module 54 is configured in accordance with the GSM protocol, it converts the outbound data 66 into a GMSK symbol stream [e.g., $A \cos(\omega(t)+\Delta f(t))$], where GMSK is a type of frequency shift keying (FSK). Thus, for this example, the baseband processing module 54 is converting the outbound voice signal 74 into the outbound voice frequency modulation information 80 (e.g., $\Delta f(t)$).

In another example, when the baseband processing module 54 is configured in accordance with the WCDMA protocol, the baseband processing module 54 uses a QPSK scheme. As such, the baseband processing module 54 is converting the outbound voice signal 74 into a QPSK symbol stream, which includes the outbound voice phase modulation information 78.

In yet another embodiment, when the baseband processing module 54 is configured in accordance with IEEE 802.11 (a), or other suffix, for voice over IP, the baseband processing module 54 uses QPSK, 16 QAM, 64 QAM, etc. When the baseband processing module 54 uses the QPSK scheme, it converts the outbound voice signal 74 into a QPSK symbol stream [e.g., $A \cos(\omega(t)+\phi(t))$] that includes the outbound voice phase modulation information 78 [e.g., $\phi(t)$]. When the baseband processing module 54 uses the 16 or 64 QAM scheme, it converts the outbound voice signal 74 into a QAM symbol stream [e.g., $A(t)\cos(\omega(t)+\phi(t))$] that includes the outbound voice phase modulation information 78 [e.g., $A(t)$] and the outbound voice amplitude modulation information 76 [e.g., $\phi(t)$].

The oscillation module 58, which will be described in greater detail with reference to FIG. 4, converts a reference oscillation 82 into an RF oscillation. A crystal oscillator or some other type of clock circuit may provide the reference oscillation 82. In the data mode, the oscillation module 58 modulates the RF oscillation based on at least one of the outbound data phase modulation information 70 and the outbound data frequency modulation information 72 to produce a modulated RF data signal 90. For example, when the IC 52 is configured in accordance with the GPRS protocol (e.g., data mode 86), the modulation mode control signal 75 causes the multiplexers (mux) to pass the outbound data frequency modulation information 72 to the oscillation module 58. The oscillation module 58 modulates the RF oscillation based on the outbound data frequency modulation information 72 to produce the modulated RF data signal 90.

In another example, when the IC 52 is configured in accordance with the EDGE or HSDPA protocol (e.g., data mode 86), the modulation mode control signal 75 causes the multiplexers to pass the outbound data phase modulation information 70 to the oscillation module 58. The oscillation module 58 modulates the RF oscillation based on the outbound data phase modulation information 70 to produce the modulated RF data signal 90.

In the voice mode, the oscillation module 58 modulates the RF oscillation based on the outbound voice phase modulation information 78 and/or the outbound voice frequency modulation information 80 to produce a modulated RF voice signal 92. For example, when the IC 52 is configured in accordance with the GSM protocol (e.g., voice mode 88), the modulation mode control signal 75 causes the multiplexers to pass the outbound voice frequency modulation information 80 to the oscillation module 58. The oscillation module 58 modulates the RF oscillation based on the outbound voice frequency modulation information 80 to produce the modulated RF voice signal 92.

In another example, when the IC 52 is configured in accordance with the WCDMA or voice over IP protocol (e.g., voice mode 88), the modulation mode control signal 75 causes the multiplexers to pass the outbound voice phase modulation information 78 to the oscillation module 58. The oscillation module 58 modulates the RF oscillation based on the outbound voice phase modulation information 78 to produce the modulated RF voice signal 92.

The frequency divider 60 divides the frequency of the modulated RF data signal 90 or the modulated RF voice signal 92 to produce a frequency divided modulated RF data signal 94 or a frequency divided modulated RF voice signal 96. For example, if the carrier frequency of the modulated RF data signal 90 or of the modulated RF voice signal 92 is in the 2 GHz frequency band (e.g., 1.90-2.45 GHz) and the desired carrier frequency is in the 900 MHz frequency band (e.g., 850-1100 MHz), then the frequency divider 60 divides the frequency of the modulated RF data signal 90 or of the modulated RF voice signal 92 to yield the desired carrier frequency. As another example, if the carrier frequency of the modulated RF data signal 90 or of the modulated RF voice signal 92 is in the 5 GHz frequency band (e.g., 4.90-5.85 GHz) and the desired carrier frequency is in the 2 GHz frequency band (e.g., 1.90-2.45 GHz), then the frequency divider 60 divides the frequency of the modulated RF data signal 90 or of the modulated RF voice signal 92 to yield the desired carrier frequency. As yet another example, if the carrier frequency of the modulated RF data signal 90 or of the modulated RF voice signal 92 is in the 5 GHz frequency band (e.g., 4.90-5.85 GHz) and the desired carrier frequency is in the 900 MHz frequency band (e.g., 850-1100 MHz), then the frequency divider 60 divides the frequency of the modulated RF data signal 90 or of the modulated RF voice signal 92 to yield the desired carrier frequency.

The first power amplifier module 62, which includes one or more power amplifier drivers and one or more power amplifiers coupled in series and/or in parallel, amplifies the modulated RF data signal 90 in accordance with the outbound data amplitude modulation information 68 when the IC is in a first frequency band mode 98 of the data mode 86 to produce a first frequency band outbound RF data signal 102. For example, when the IC 52 is configured for the first frequency band of the GPRS protocol, the data modulation scheme is GMSK. In this scheme, the amplitude of the RF data signal 90 is not to be modulated, thus the multiplexers pass the constant amplitude value ($C_{AM}$) 84 to the first power amplifier module 62. Accordingly, the power amplifier module 62 outputs the $1^{st}$ frequency band outbound RF data signal 102 that is only frequency (e.g., GMSK) modulated (e.g., the amplitude modulation information is the constant amplitude value 84).

As another example, when the IC is configured for the first frequency band of the EDGE protocol, which uses an 8-PSK modulation scheme, or HSDPA protocol, which uses a 16-QAM modulation scheme under good radio conditions, the amplitude of the RF data signal 90 is to be modulated. Thus, the multiplexers provide the outbound data amplitude modulation information 68 to the power amplifier module 62. Accordingly, the power amplifier module 62 outputs the $1^{st}$ frequency band outbound RF data signal 102 that is both phase and amplitude modulated.

As yet another example, when the IC is configured for the first frequency band of the HSDPA protocol, which uses a QPSK modulation scheme under initial and normal radio conditions, the amplitude of the RF data signal 90 is not to be modulated. Thus, the multiplexers provide the constant amplitude value 84 to the power amplifier module 62. Accordingly, the power amplifier module 62 outputs the $1^{st}$ frequency band outbound RF data signal 102 that is only phase modulated (e.g., the amplitude modulation information is the constant amplitude value 84).

When the IC 52 is in the voice mode 88 and in the first frequency band mode 98, the power amplifier module 62 amplifies the modulated RF voice signal 92 in accordance with the outbound voice amplitude modulation information 76 to produce a first frequency band outbound RF voice signal 104. For example, when the IC 52 is configured for the first frequency band of the GSM protocol, the data modulation scheme is GMSK. In this scheme, the amplitude of the RF voice signal 92 is not to be modulated, thus the multiplexers pass the constant amplitude value ($C_{AM}$) 84 to the first power amplifier module 62. Accordingly, the power amplifier module 62 outputs the $1^{st}$ frequency band outbound RF voice signal 104 that is only frequency (e.g., GMSK) modulated (e.g., the amplitude modulation information is the constant amplitude value 84).

As another example, when the IC is configured for the first frequency band of the voice over IP protocol, which uses QAM modulation scheme, the amplitude of the RF voice signal 92 is to be modulated. Thus, the multiplexers provide the outbound voice amplitude modulation information 76 to the power amplifier module 62. Accordingly, the power amplifier module 62 outputs the $1^{st}$ frequency band outbound RF voice signal 104 that is both phase and amplitude modulated.

As yet another example, when the IC is configured for the first frequency band of the WCDMA protocol, which uses a QPSK modulation scheme, the amplitude of the RF data signal 90 is not to be modulated. Thus, the multiplexers provide the constant amplitude value 84 to the power amplifier module 62. Accordingly, the power amplifier module 62 outputs the $1^{st}$ frequency band outbound RF voice signal 104 that is only phase modulated (e.g., the amplitude modulation information is the constant amplitude value 84).

The second power amplifier module 64, which includes one or more power amplifier drivers and one or more power amplifiers coupled in series and/or in parallel, amplifies the frequency divided modulated RF data signal 94 in accordance with the outbound data amplitude modulation information 68 when the IC is in a second frequency band mode 100 of the data mode 86 to produce a second frequency band outbound RF data signal 106. For example, when the IC 52 is configured for the second frequency band (e.g., 900 MHz) of the GPRS protocol, the data modulation scheme is GMSK. In this scheme, the amplitude of the frequency divided RF data signal 94 is not to be modulated, thus the multiplexers pass the constant amplitude value ($C_{AM}$) 84 to the second power amplifier module 64. Accordingly, the power amplifier module 64 outputs the $2^{nd}$ frequency band outbound RF data signal 106 that is only frequency (e.g., GMSK) modulated (e.g., the amplitude modulation information is the constant amplitude value 84).

As another example, when the IC is configured for the second frequency band (e.g., 900 MHz) of the EDGE protocol, which uses an 8-PSK modulation scheme, or HSDPA protocol, which uses a 16-QAM modulation scheme under good radio conditions, the amplitude of the frequency divided RF data signal 94 is to be modulated. Thus, the multiplexers provide the outbound data amplitude modulation information 68 to the power amplifier module 64. Accordingly, the power amplifier module 64 outputs the $2^{nd}$ frequency band outbound RF data signal 106 that is both phase and amplitude modulated.

As yet another example, when the IC is configured for the second frequency band of the HSDPA protocol, which uses a QPSK modulation scheme under initial and normal radio conditions, the amplitude of the frequency divided RF data signal 94 is not to be modulated. Thus, the multiplexers provide the constant amplitude value 84 to the power amplifier module 64. Accordingly, the power amplifier module 64 outputs the $2^{nd}$ frequency band outbound RF data signal 106 that is only phase modulated (e.g., the amplitude modulation information is the constant amplitude value 84).

When the IC 52 is in the voice mode 88 and in the second frequency band mode 100, the power amplifier module 64 amplifies the frequency divided modulated RF voice signal 96 in accordance with the outbound voice amplitude modulation information 76 to produce the second frequency band outbound RF voice signal 108. For example, when the IC 52 is configured for the second frequency band of the GSM protocol, the data modulation scheme is GMSK. In this scheme, the amplitude of the frequency divided RF voice signal 96 is not to be modulated, thus the multiplexers pass the constant amplitude value ($C_{AM}$) 84 to the second power amplifier module 64. Accordingly, the power amplifier module 64 outputs the $2^{nd}$ frequency band outbound RF voice signal 108 that is only frequency (e.g., GMSK) modulated (e.g., the amplitude modulation information is the constant amplitude value 84).

As another example, when the IC is configured for the second frequency band of the voice over IP protocol, which uses QAM modulation scheme, the amplitude of the frequency divided RF voice signal 96 is to be modulated. Thus, the multiplexers provide the outbound voice amplitude modulation information 76 to the power amplifier module 64. Accordingly, the power amplifier module 64 outputs the $2^{nd}$ frequency band outbound RF voice signal 108 that is both phase and amplitude modulated.

As yet another example, when the IC is configured for the first frequency band of the WCDMA protocol, which uses a QPSK modulation scheme, the amplitude of the frequency divided RF data signal 96 is not to be modulated. Thus, the multiplexers provide the constant amplitude value 84 to the power amplifier module 64. Accordingly, the power amplifier module 64 outputs the $2^{nd}$ frequency band outbound RF voice signal 108 that is only phase modulated (e.g., the amplitude modulation information is the constant amplitude value 84). Note that the multiplexers are illustrative of the selective operation of the IC 52 and not necessarily physical components. For instance, the selective operation of the IC 52 may be achieved by enabling and/or disabling portions of the IC 52 to provide the voice mode or the data mode and/or to provide the first frequency mode or the second frequency mode.

Figure 3:
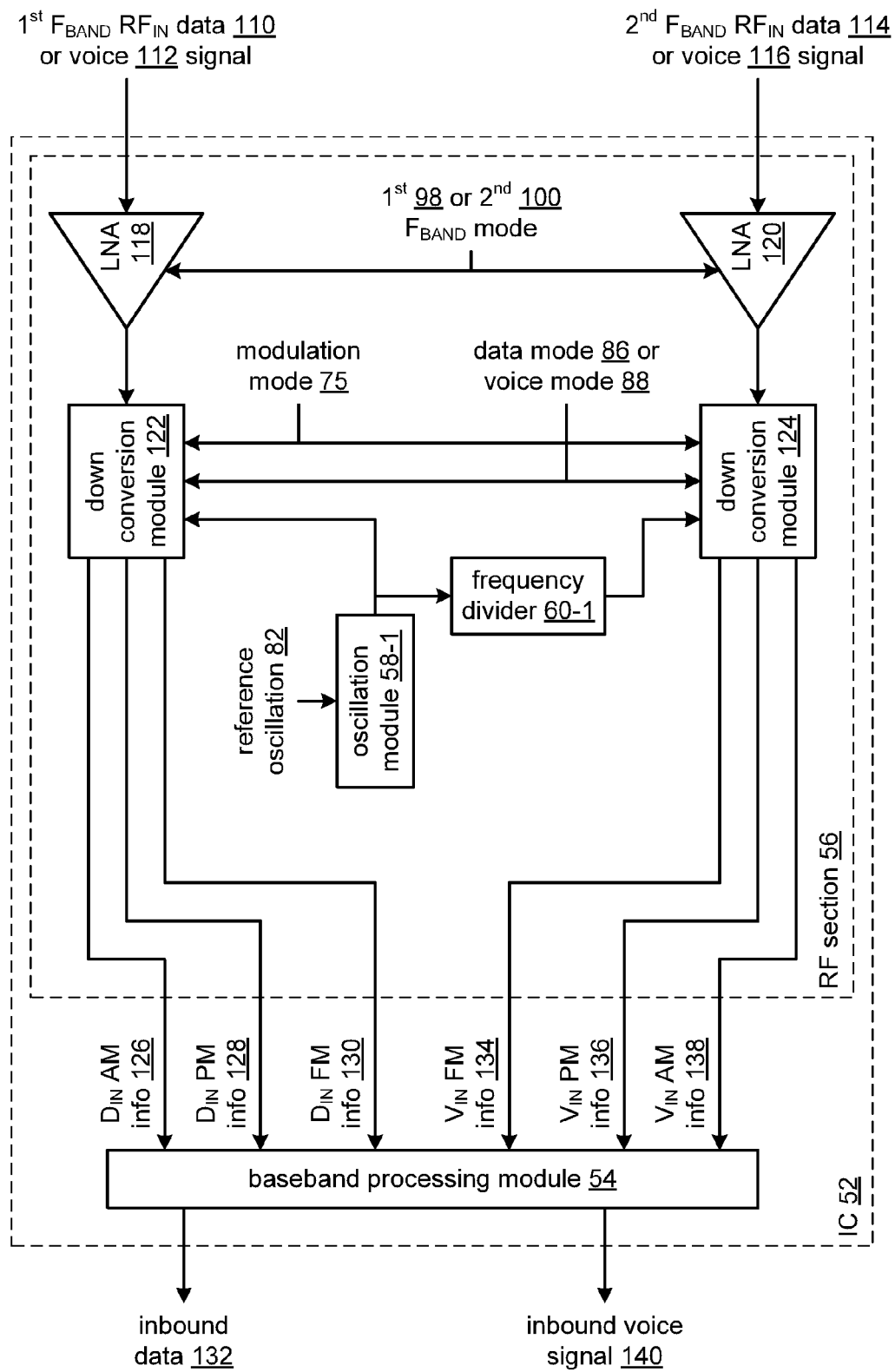
FIG. 3 is a schematic block diagram of an embodiment of an integrated circuit in accordance with the present invention.

FIG. 3 is a schematic block diagram of an embodiment of an integrated circuit 52 that includes the RF section 56 and the baseband processing module 54 functioning to convert a first frequency band inbound RF data signal 110, a first frequency band inbound RF voice signal 112, a second frequency band inbound RF data signal 114, a second frequency band inbound RF voice signal 116 into inbound data 132 and/or an inbound voice signal 140. In this embodiment, the RF section 54 includes a first low noise amplifier (LNA) module 118, a second LNA module 120, a first down-conversion module 122, a second down conversion module 124, an oscillation module 58-1, and a frequency divider 60-1.

The oscillation module 58-1 may be the same oscillation module 58 as shown in FIG. 2 or it may be a separate oscillation module. In either case, the oscillation module 58-1 generates a first receiver local oscillation from the reference oscillation 82. The frequency divider 60-1 divides the first receiver local oscillation to produce a second receiver local oscillation. Note that the first receiver local oscillation corresponds to the first frequency band and the second receiver local oscillation corresponds to the second frequency band.

When the IC 52 is in the first frequency band mode 98 of the voice mode 88, LNA module 118, which includes one or more low noise amplifiers coupled in series and/or in parallel, amplifies the first frequency band inbound RF voice signal 112. The down conversion module 122 down converts the amplified first frequency band inbound RF voice signal based on the first receiver local oscillation to produce inbound voice amplitude modulation information 138, inbound voice phase modulation information 136, and/or inbound voice frequency modulation information 134. The baseband processing module 54 converts the inbound voice amplitude modulation information 138, the inbound voice phase modulation information 136, and/or the inbound voice frequency modulation information 134 into the inbound voice signal 140.

When the IC 52 is in the first frequency band mode 98 of the data mode 86, LNA module 118 amplifies the first frequency band inbound RF data signal 110. The down conversion module 122 down converts the amplified first frequency band inbound RF data signal based on the first receiver local oscillation to produce inbound data amplitude modulation information 126, inbound data phase modulation information 128, and/or inbound data frequency modulation information 130. The baseband processing module 54 converts the inbound data amplitude modulation information 126, the inbound data phase modulation information 128, and/or the inbound data frequency modulation information 130 into the inbound data 132.

When the IC 52 is in the second frequency band mode 100 of the voice mode 88, LNA module 120, which includes one or more low noise amplifiers coupled in series and/or in parallel, amplifies the second frequency band inbound RF voice signal 116. The down conversion module 124 down converts the amplified second frequency band inbound RF voice signal based on the second receiver local oscillation to produce the inbound voice amplitude modulation information 138, the inbound voice phase modulation information 136, and/or the inbound voice frequency modulation information 134. The baseband processing module 54 converts the inbound voice amplitude modulation information 138, the inbound voice phase modulation information 136, and/or the inbound voice frequency modulation information 134 into the inbound voice signal 140.

When the IC 52 is in the second frequency band mode 100 of the data mode 86, LNA module 120 amplifies the second frequency band inbound RF data signal 114. The down conversion module 124 down converts the amplified second frequency band inbound RF data signal based on the second receiver local oscillation to produce the inbound data amplitude modulation information 126, the inbound data phase modulation information 128, and/or the inbound data frequency modulation information 130. The baseband processing module 54 converts the inbound data amplitude modulation information 126, the inbound data phase modulation information 128, and/or the inbound data frequency modulation information 130 into the inbound data 132.

Figure 4:
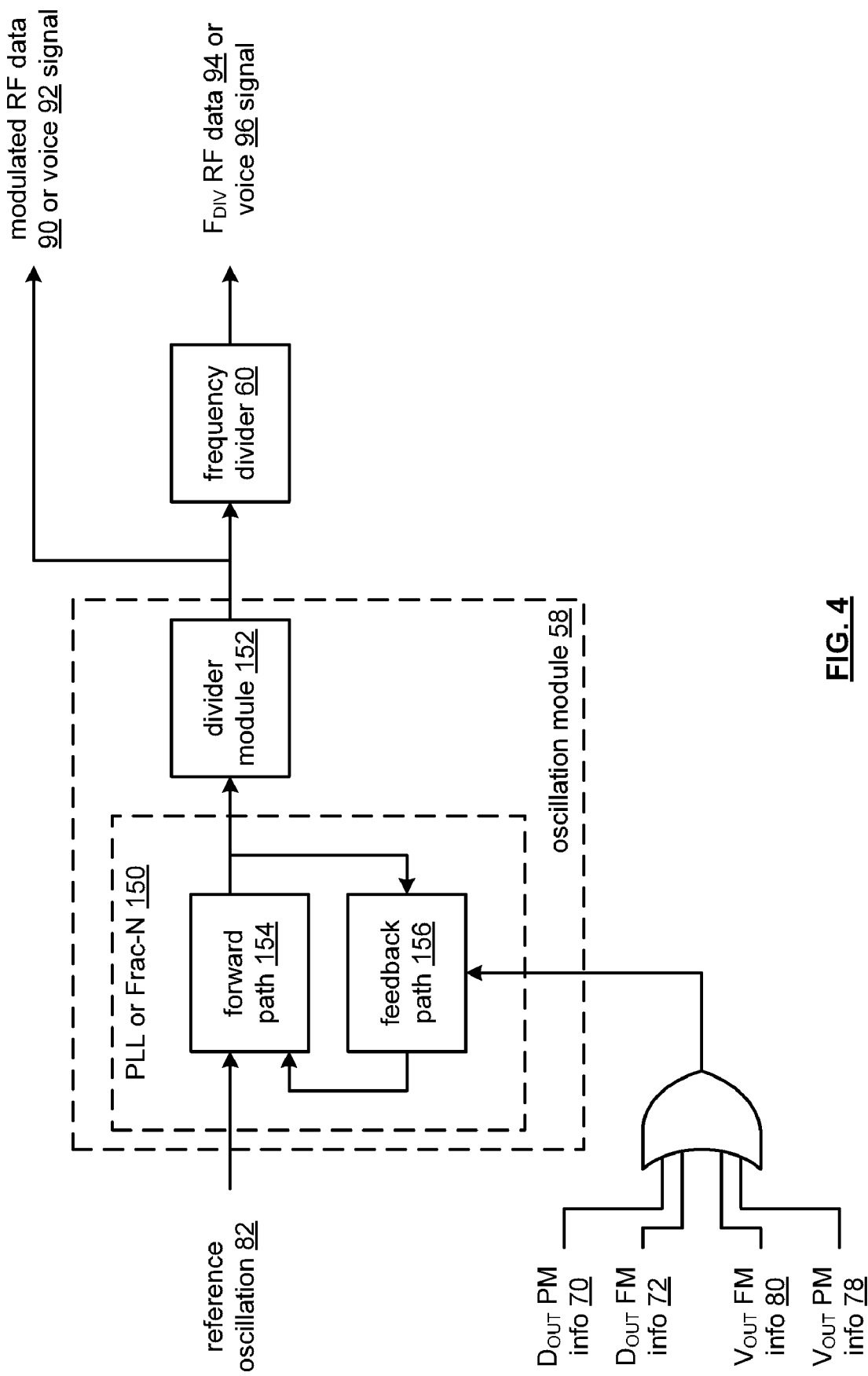
FIG. 4 is a schematic block diagram of an embodiment of an oscillation module coupled to a frequency divider in accordance with the present invention.

FIG. 4 is a schematic block diagram of an embodiment of an oscillation module 58 coupled to a frequency divider 60. The oscillation module 58 includes a phase locked loop (PLL) or fractional-N synthesizer (Frac-N) module 150 and a divider module 152. In one embodiment, the PLL 150 includes a forward path 154 and a feedback path 156. The forward path 154 generates a PLL oscillation based on the reference oscillation 82 and a feedback oscillation. The feedback path 156 generates the feedback oscillation based on a divided representation of the PLL oscillation and the outbound voice or data phase modulation information 70, 72, 78, or 80. The divider module 152 divides the frequency of the PLL oscillation to produce the RF oscillation, which includes the modulated RF data signal 90 and/or the modulated RF voice signal 92.

In another embodiment, the Frac-N 150 includes a forward path 154 and a feedback path 156. The forward path 154 generates an oscillation based on the reference oscillation 82 and a feedback oscillation. The feedback path 156 generates the feedback oscillation based on a divided representation of the oscillation and the outbound voice or data phase modulation information 70, 72, 78, or 80. The divider module 152 divides the frequency of the oscillation to produce the RF oscillation, which includes the modulated RF data signal 90 and/or the modulated RF voice signal 92.

Figure 5:
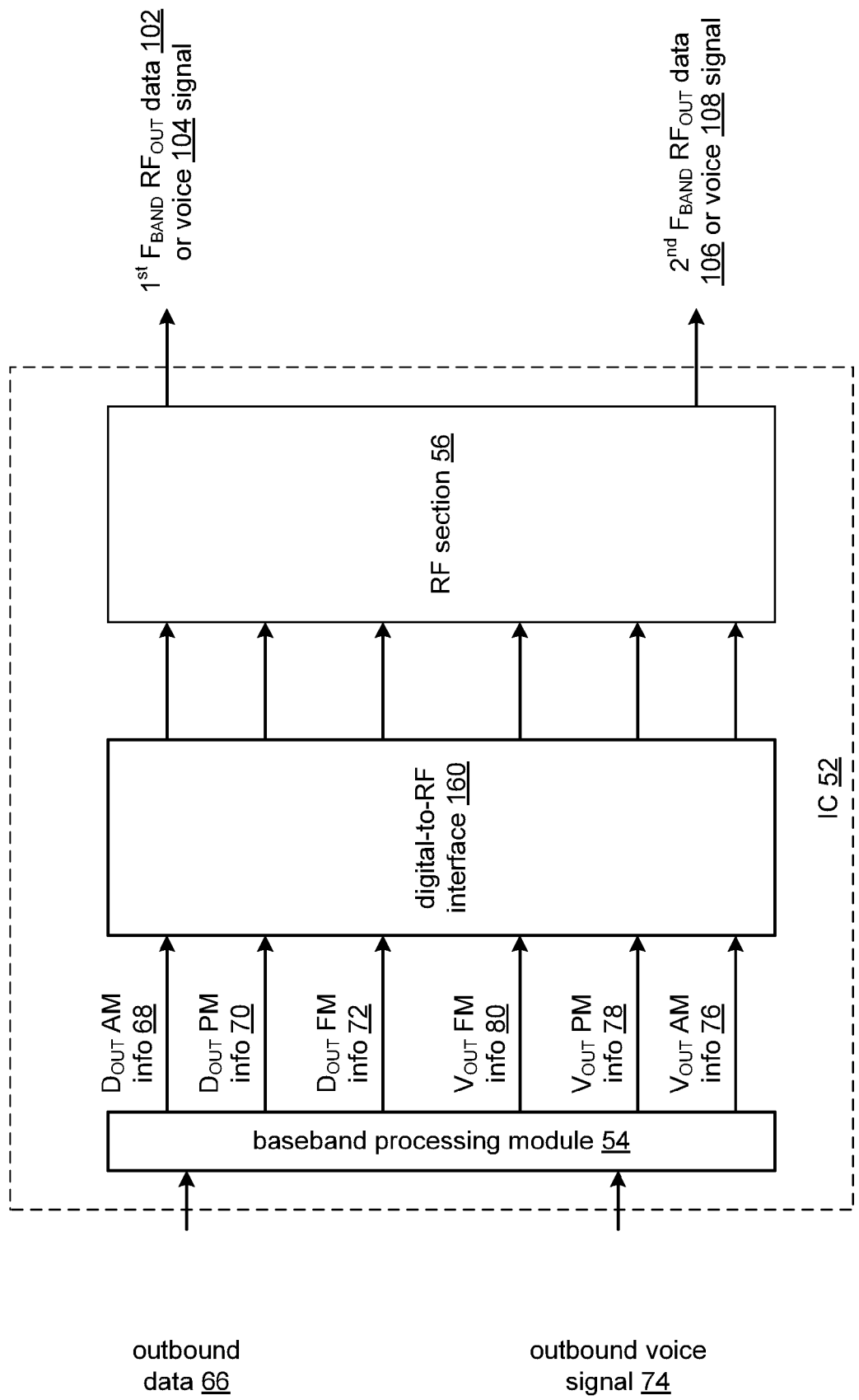
FIG. 5 is a schematic block diagram of another embodiment of an integrated circuit in accordance with the present invention.

FIG. 5 is a schematic block diagram of another embodiment of an integrated circuit 50 that includes the baseband processing module 54, the RF section 56, and a digital-to-RF interface 160. The digital-to-RF interface 160 may be implemented as discussed in co-pending patent application entitled VOICE/DATA/RF INTEGRATED CIRCUIT, having a filing date of Dec. 19, 2006, and a Ser. No. 11/641,999.

Figure 6:
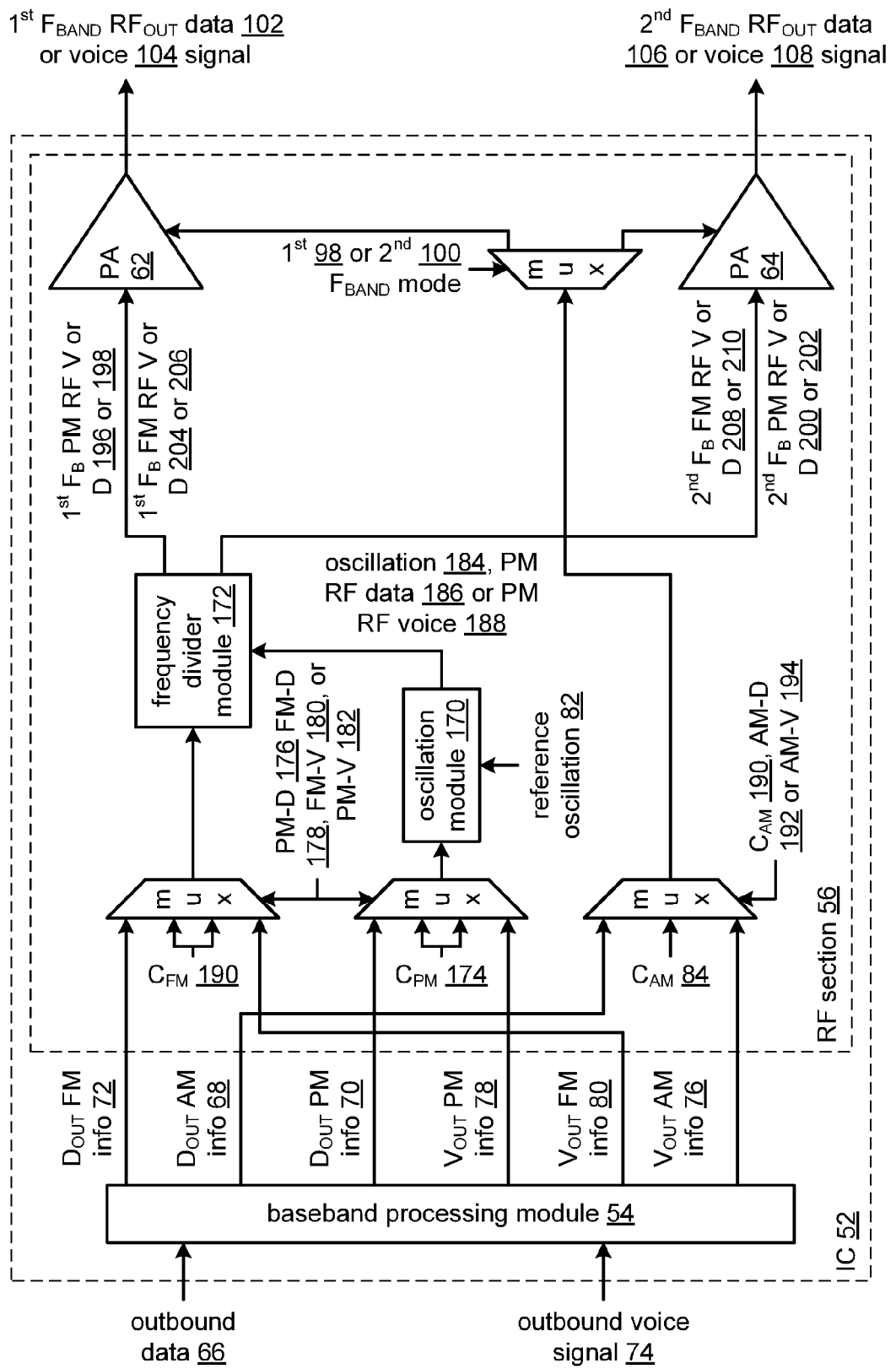
FIG. 6 is a schematic block diagram of another embodiment of an integrated circuit in accordance with the present invention.

FIG. 6 is a schematic block diagram of another embodiment of an integrated circuit 52 that includes the baseband processing module 54 and the RF section 56. The RF section 56 includes an oscillation module 170, a frequency divider module 172, the first power amplifier module 62, and the second power amplifier module 64. The baseband processing module 54 operates as previously discussed with reference to FIGS. 2 and 3 to convert outbound data 66 into the outbound data amplitude modulation information 68, the outbound data phase modulation information 70, and the outbound data frequency modulation information 72 and to convert the outbound voice signal 74 into the outbound voice amplitude modulation information 76, the outbound voice phase modulation information 78, and/or the outbound voice frequency modulation information 80.

In this embodiment, the oscillation module 170, which may include a phase locked loop, a fractional-N synthesizer, and/or a divider module, converts the reference oscillation 82 into an oscillation 184. When the IC 52 is in a first state (e.g., phase modulation state—PM-D) of the data mode 176, the oscillation module 170 modulates the oscillation 184 based on the outbound data phase modulation information 70 to produce a phase modulated RF data signal 186. When the IC 52 is in a first state of the voice mode 182 (e.g., phase modulation (PM) of the voice signal), the oscillation module 170 modulates the oscillation 184 based on the outbound voice phase modulation information 78 to produce a phase modulated RF voice signal 188. When the IC 52 is in a second state (e.g., frequency modulate [FM]) of the data mode 178 or the voice mode 180, the oscillation module 170 outputs the oscillation 184. In one embodiment, the oscillation module 170 modulates the oscillation 184 based on the constant phase modulation information (e.g., 0 phase shift) to produce the outputted oscillation 184.

The frequency divider module 172, which will be described in greater detail with reference to FIG. 7 divides the frequency of the phase modulated RF data 186 or voice signal 188 to a first frequency band to produce a first frequency band phase modulated RF data 196 or voice signal 198 when the IC 52 is in a first frequency band mode 98 of the first state of the voice or data modes. When the IC 52 is in a second frequency band mode 100 of the first state of the voice or data modes, the divider module divides the frequency of the phase modulated RF data 186 or voice signal 188 to a second frequency band to produce a second frequency band phase modulated RF data 208 or voice signal 210.

When the IC 52 is in a second state of the data mode and in the first frequency band mode 98, the frequency divider module 172 modulates the oscillation 184 based on the outbound data frequency modulation information 72 to produce a frequency modulated RF data signal 204. When the IC 52 is in a second state of the voice mode and in the first frequency band mode 98, the frequency divider module 172 modulates the oscillation 184 based on the outbound voice frequency modulation information 80 to produce a frequency modulated RF voice signal 206.

When the IC 52 is in a second state of the data mode and in the second frequency band mode 100, the frequency divider module 172 divides the frequency of the frequency modulated RF data 204 or voice signal 206 to the second frequency band to produce a second frequency band frequency modulated RF data 208 or voice signal 210.

The first power amplifier module 62 is coupled to amplify the first frequency band phase modulated RF data signal 196 in accordance with the outbound data amplitude modulation information 68 or the constant amplitude modulation value 84 to produce a first frequency band outbound RF data signal 102. The first power amplifier module 62 amplifies the first frequency band phase modulated RF voice signal 198 in accordance with the outbound voice amplitude modulation information 76 or the constant amplitude value 84 to produce the first frequency band outbound RF voice signal 104. The first power amplifier module 62 also amplifies the first frequency band frequency modulated RF data 204 or voice signal 206 to produce the first frequency band outbound RF data signal 102 or the first frequency band outbound RF voice signal 104.

The second power amplifier module 64 amplifies the second frequency band phase modulated RF data signal 208 in accordance with the outbound data amplitude modulation information 68 or the constant amplitude value 84 (e.g., 1) to produce the second frequency band outbound RF data signal 106. The second power amplifier module 64 amplifies the second frequency band phase modulated RF voice signal 210 in accordance with the outbound voice amplitude modulation information 76 or the constant amplitude value 84 to produce the second frequency band outbound RF voice signal 108. The second power amplifier module 64 also amplifies the second frequency band frequency modulated RF data 208 or voice signal 210 to produce the second frequency band outbound RF data signal 106 or the second frequency band outbound RF voice signal 108.

Figure 7:
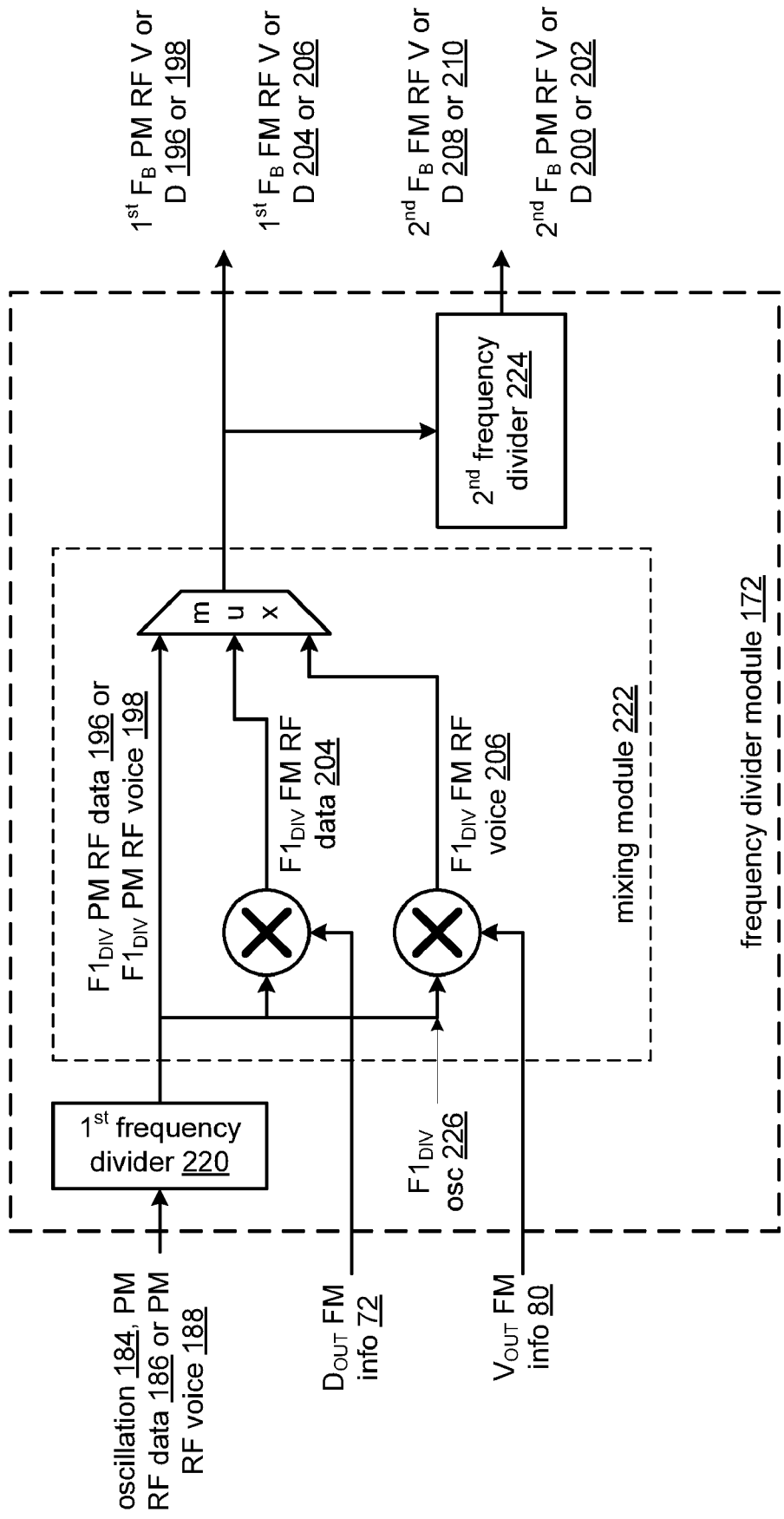
FIG. 7 is a schematic block diagram of an embodiment of a frequency divider module in accordance with the present invention.

FIG. 7 is a schematic block diagram of an embodiment of a frequency divider module 172 that includes a $1^{st}$ frequency divider 220, a second frequency divider 224, and a mixing module 224. The first frequency divider 220 is coupled to divide the frequency of the phase modulated RF data signal 186, the phase modulated RF voice signal 188, or the oscillation 184 to produce a first frequency divided phase modulated RF data signal 196, a first frequency divided phase modulated voice signal 198, or a first frequency divided oscillation 226.

The mixing module 222 mixes the first frequency divided oscillation 226 with the outbound data frequency modulation information 72 to produce the first frequency band frequency modulated RF data signal 204; mixes the first frequency divided oscillation 226 with the outbound voice frequency modulation information 80 to produce the first frequency band frequency modulated RF voice signal 206; or passes the first frequency divided phase modulated RF data or voice signal 196 or 198.

The second frequency divider 224, when enabled, divides the frequency the first frequency band frequency modulated RF data signal 204 to produce the second frequency band frequency modulated RF data signal 208; divides the frequency the first frequency band frequency modulated RF voice signal 206 to produce the second frequency band frequency modulated RF voice signal 210; or divides the frequency of the first frequency band phase modulated RF data or voice signal 196 or 198 to produce the second frequency band phase modulated RF data or voice signal 200 or 202.

Figure 8:
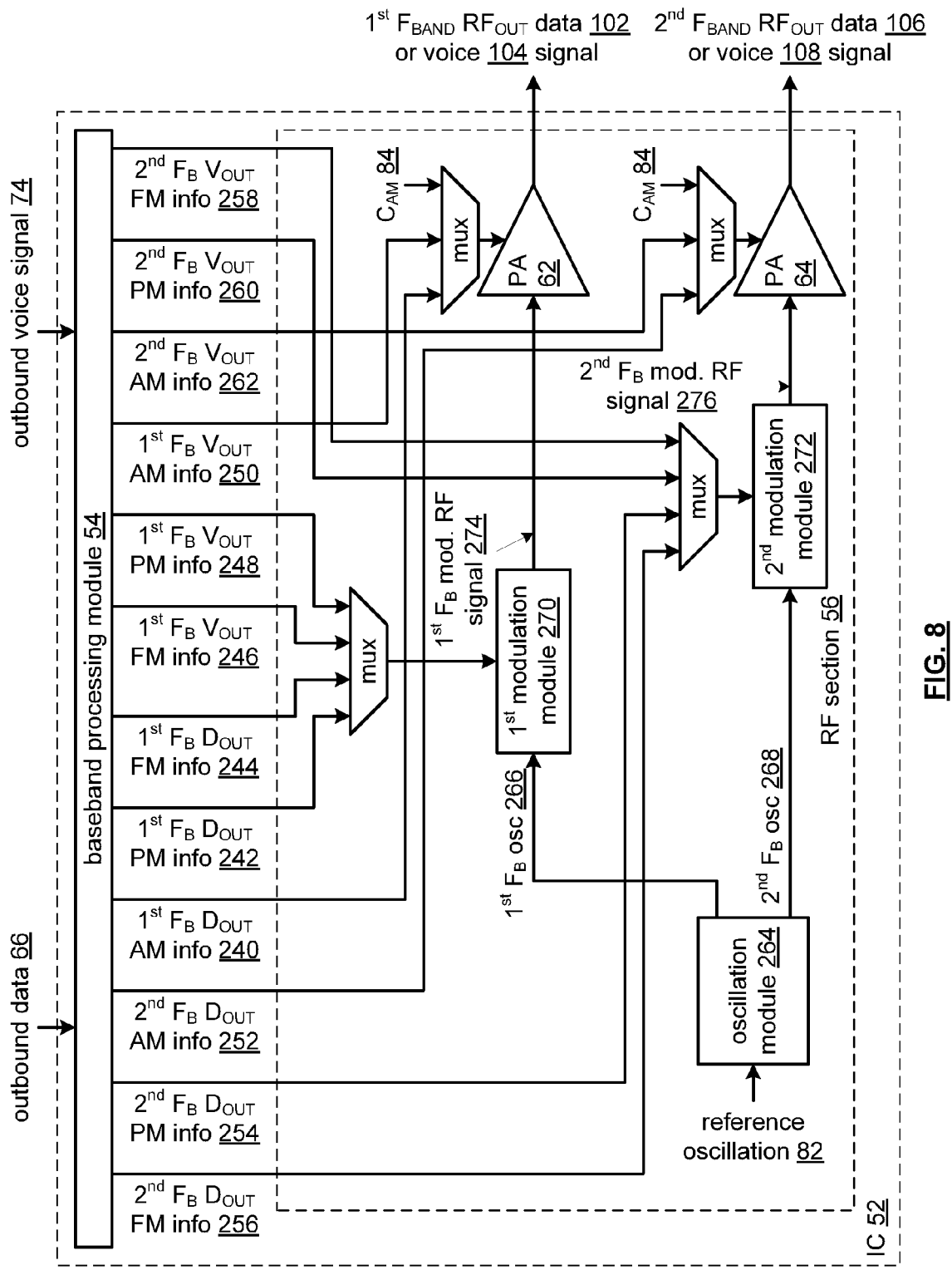
FIG. 8 is a schematic block diagram of another embodiment of an integrated circuit in accordance with the present invention.

FIG. 8 is a schematic block diagram of another embodiment of an integrated circuit 52 that includes the baseband processing module 54 and the RF section 56. The RF section 56 includes an oscillation module 264, a $1^{st}$ modulation module 270, a $2^{nd}$ modulation module 272, the first power amplifier module 62, and the second power amplifier module 64.

In this embodiment, the baseband processing module 54 converts the outbound data 66 into at least one of first frequency band outbound data amplitude modulation information 240, first frequency band outbound data phase modulation information 242, and first frequency band outbound data frequency modulation information 244 when the IC 52 is in a first frequency band data mode. When the IC 52 is in a second frequency band data mode, the baseband processing module 54 converts the outbound data 66 into at least one of second frequency band outbound data amplitude modulation information 252, second frequency band outbound data phase modulation information 254, and second frequency band outbound data frequency modulation information 256.

When the IC 52 is in a first frequency band voice mode, the baseband processing module 54 converts the outbound voice signal 74 into at least one of first frequency band outbound voice amplitude modulation information 250, first frequency band outbound voice phase modulation information 248, and first frequency band outbound voice frequency modulation information 246. When the IC 52 is in a second frequency band voice mode, the baseband processing module 54 converts the outbound voice signal 74 into at least one of second frequency band outbound voice amplitude modulation information 262, second frequency band outbound voice phase modulation information 260, and second frequency band outbound voice frequency modulation information 258.

The oscillation module 264, which will be described in greater detail with reference to FIG. 9, converts a reference oscillation 82 into a first frequency band oscillation 266 and a second frequency band oscillation 268. The first modulation module 270, which will be described in greater detail with reference to FIG. 9, modulates the first frequency band oscillation 266 in accordance with at least one of the first frequency band outbound voice frequency modulation information 246, the first frequency band outbound voice phase modulation information 248, the first frequency band outbound data frequency modulation information 244, and the first frequency band outbound data phase modulation information 242 to produce a first frequency band modulated RF signal 274.

The second modulation module 272, which will be described in greater detail with reference to FIG. 9, modulates the second frequency band oscillation 268 in accordance with at least one of the second frequency band outbound voice frequency modulation information 258, the second frequency band outbound voice phase modulation information 260, the second frequency band outbound data frequency modulation information 256, and the second frequency band outbound data phase modulation information 254 to produce a second frequency band modulated RF signal 276.

The first power amplifier module 62 amplifies the first frequency band modulated RF data signal 274 in accordance with at least one of the first frequency band outbound voice amplitude modulation information 250 and the first frequency band outbound data amplitude modulation information 240 (either of which includes the constant amplitude value 84) to produce the first frequency band outbound RF voice signal 104 or the first frequency band outbound RF data signal 102.

The second power amplifier module 64 amplifies the second frequency band modulated RF data signal 276 in accordance with at least one of the second frequency band outbound voice amplitude modulation information 262 and the second frequency band outbound data amplitude modulation information 252 (either of which includes the constant amplitude value 84) to produce the second frequency band outbound RF voice signal 108 or the second frequency band outbound RF data signal 106.

In an embodiment, the baseband processing module is further coupled for at least one of: converting the outbound data into the first or second frequency band outbound data amplitude modulation information and the first or second frequency band outbound data phase modulation information in accordance with an Enhanced Data for GSM Evolution (EDGE) protocol; and converting the outbound data into the first or second frequency band outbound data frequency modulation information in accordance with a General Packet Radio Service (GPRS) protocol.

In another embodiment, the baseband processing module is further coupled for at least one of: converting the outbound voice signal into the first or second frequency band outbound voice frequency modulation information in accordance with a Global System for Mobile Communications (GSM) protocol; and converting the outbound voice signal into the first or second frequency band outbound voice phase modulation information in accordance with a code division multiple access (CDMA) protocol.

Figure 9:
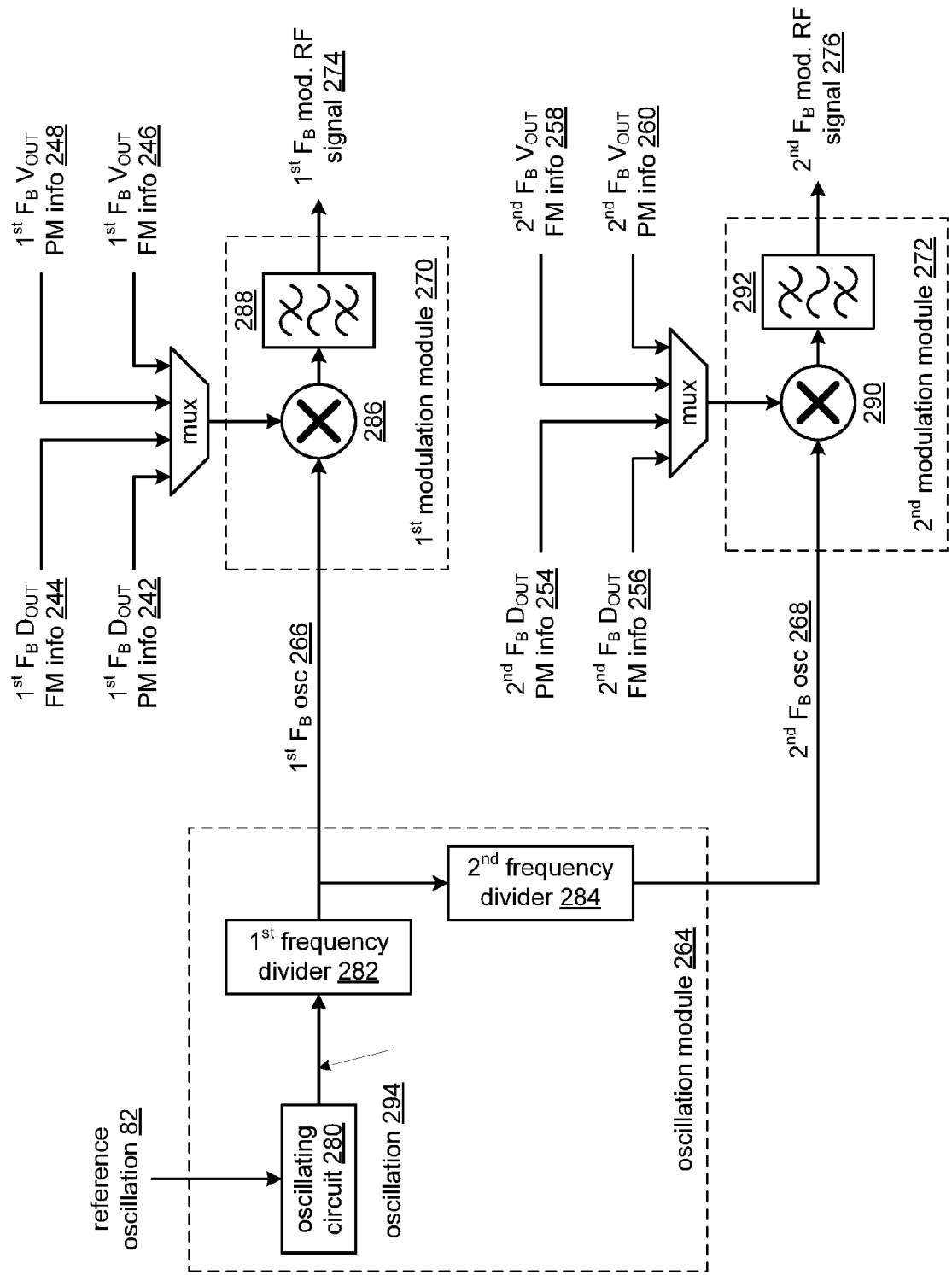
FIG. 9 is a schematic block diagram of an embodiment of an oscillation module and modulation modules in accordance with the present invention.

FIG. 9 is a schematic block diagram of an embodiment of the oscillation module 264 and the modulation modules 270-272. The oscillation module 264 includes an oscillating circuit 280, a first frequency divider 282, and a second frequency divider 284. The first modulation module 270 includes a mixer 286 and a bandpass filter 288. The second modulation module 272 includes a mixer 290 and a bandpass filter 292.

In this embodiment, the oscillating circuit 280, which may include a PLL, a fractional-N synthesizer, and/or a clock circuit, converts the reference oscillation 82 into an oscillation 294. The first frequency divider 282 divides the frequency of the oscillation 294 to produce the first frequency band oscillation 266. The second frequency divider 284 divides the frequency of the first frequency band oscillation 266 to produce the second frequency band oscillation 268.

The mixer 286 of the first modulation module 270 mixes the first frequency band oscillation 266 with one of the first frequency band outbound voice frequency modulation information 246, the first frequency band outbound voice phase modulation information 248, the first frequency band outbound data frequency modulation information 244, and the first frequency band outbound data phase modulation information 242 to produce a first frequency band mixed signal. The bandpass filter module 288 filters the first frequency band mixed signal to produce the first frequency band modulated RF signal 274.

The mixer 290 of the second modulation module 272 mixes the second frequency band oscillation 268 with one of the second frequency band outbound voice frequency modulation information 258, the second frequency band outbound voice phase modulation information 260, the second frequency band outbound data frequency modulation information 256, and the second frequency band outbound data phase modulation information 254 to produce a second frequency band mixed signal. The second bandpass filter module 292 filters the second frequency band mixed signal to produce the second frequency band modulated RF signal 276.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. An integrated circuit (IC) comprises:
a baseband processing module coupled to:
  convert outbound data into at least one of first frequency band outbound data amplitude modulation information, first frequency band outbound data phase modulation information, and first frequency band outbound data frequency modulation information when the IC is in a first frequency band data mode;
  convert the outbound data into at least one of second frequency band outbound data amplitude modulation information, second frequency band outbound data phase modulation information, and second frequency band outbound data frequency modulation information when the IC is in a second frequency band data mode;
  convert an outbound voice signal into at least one of first frequency band outbound voice amplitude modulation information, first frequency band outbound voice phase modulation information, and first frequency band outbound voice frequency modulation information when the IC is in a first frequency band voice mode; and
  convert the outbound voice signal into at least one of second frequency band outbound voice amplitude modulation information, second frequency band outbound voice phase modulation information, and second frequency band outbound voice frequency modulation information when the IC is in a second frequency band voice mode; and
a radio frequency (RF) section that includes:
  an oscillation module coupled to convert a reference oscillation into a first frequency band oscillation and a second frequency band oscillation;
  a first modulation module coupled to modulate the first frequency band oscillation in accordance with at least one of the first frequency band outbound voice frequency modulation information, the first frequency band outbound voice phase modulation information, the first frequency band outbound data frequency modulation information, and the first frequency band outbound data phase modulation information to produce a first frequency band modulated RF signal;
  a second modulation module coupled to modulate the second frequency band oscillation in accordance with at least one of the second frequency band outbound voice frequency modulation information, the second frequency band outbound voice phase modulation information, the second frequency band outbound data frequency modulation information, and the second frequency band outbound data phase modulation information to produce a second frequency band modulated RF signal;
  a first power amplifier module coupled to amplify the first frequency band modulated RF data signal in accordance with at least one of the first frequency band outbound voice amplitude modulation information and the first frequency band outbound data amplitude modulation information to produce at least one of a first frequency band outbound RF voice signal and a first frequency band outbound RF data signal; and
  a second power amplifier module coupled to amplify the second frequency band modulated RF data signal in accordance with at least one of the second frequency band outbound voice amplitude modulation information and the second frequency band outbound data amplitude modulation information to produce at least one of a second frequency band outbound RF voice signal and a second frequency band outbound RF data signal.

2. The IC of claim 1, further comprises:
the RF section coupled to:
  convert a first frequency band inbound RF voice signal into at least one of inbound voice amplitude modulation information, inbound voice phase modulation information, and inbound voice frequency modulation information when the IC is in the first frequency band mode of the voice mode;
  convert a second frequency band inbound RF voice signal into the at least one of inbound voice amplitude modulation information, inbound voice phase modulation information, and inbound voice frequency modulation information when the IC is in the second frequency band mode of the voice mode;
  convert a first frequency band inbound RF data signal into at least one of inbound data amplitude modulation information, inbound data phase modulation information, and inbound data frequency modulation information when the IC is in the first frequency band mode of the data mode; and convert a second frequency band inbound RF data signal into the at least one of inbound data amplitude modulation information, inbound data phase modulation information, and inbound data frequency modulation information when the IC is in a second frequency band mode of the data mode;

a baseband processing module coupled to:

convert the at least one of inbound data amplitude modulation information, inbound data phase modulation information, and inbound data frequency modulation information into inbound data when the IC is in the data mode; and convert the at least one of inbound voice amplitude modulation information, inbound voice phase modulation information, and inbound voice frequency modulation information when the IC is in the voice mode.

3. The IC of claim 1, wherein the oscillation module comprises:

an oscillating circuit coupled to convert the reference oscillation into an oscillation;

a first frequency divider coupled to divide frequency of the oscillation to produce the first frequency band oscillation; and a second frequency divider coupled to divide frequency of the first frequency band oscillation to produce the second frequency band oscillation.

4. The IC of claim 1, further comprises:

the first modulation module including:

a first mixing module coupled to mix the first frequency band oscillation with the at least one of the first frequency band outbound voice frequency modulation information, the first frequency band outbound voice phase modulation information, the first frequency band outbound data frequency modulation information, and the first frequency band outbound data phase modulation information to produce a first frequency band mixed signal; and a first filter module coupled to filter the first frequency band mixed signal to produce the first frequency band modulated RF signal; and the second modulation module including:

a second mixing module coupled to mix the second frequency band oscillation with the at least one of the second frequency band outbound voice frequency modulation information, the second frequency band outbound voice phase modulation information, the second frequency band outbound data frequency modulation information, and the second frequency band outbound data phase modulation information to produce a second frequency band mixed signal; and a second filter module coupled to filter the second frequency band mixed signal to produce the second frequency band modulated RF signal.

5. The IC of claim 1, wherein the baseband processing module is further coupled for at least one of:

converting the outbound data into the first or second frequency band outbound data amplitude modulation information and the first or second frequency band outbound data phase modulation information in accordance with an Enhanced Data for GSM Evolution (EDGE) protocol; and converting the outbound data into the first or second frequency band outbound data frequency modulation information in accordance with a General Packet Radio Service (GPRS) protocol.

6. The IC of claim 1, wherein the baseband processing module is further coupled for at least one of:

converting the outbound voice signal into the first or second frequency band outbound voice frequency modulation information in accordance with a Global System for Mobile Communications (GSM) protocol; and converting the outbound voice signal into the first or second frequency band outbound voice phase modulation information in accordance with a code division multiple access (CDMA) protocol.

* * * * *